United States Patent
Ganesan et al.

(10) Patent No.: US 11,683,822 B2
(45) Date of Patent: Jun. 20, 2023

(54) SELECTION OF A SCHEDULING USER EQUIPMENT

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Joachim Loehr, Wiesbaden (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/929,561

(22) Filed: Sep. 2, 2022

(65) Prior Publication Data

US 2022/0417950 A1 Dec. 29, 2022

Related U.S. Application Data

(63) Continuation of application No. 16/816,001, filed on Mar. 11, 2020, now Pat. No. 11,452,120.

(Continued)

(51) Int. Cl.
*H04W 72/12* (2023.01)
*H04W 4/029* (2018.01)
(Continued)

(52) U.S. Cl.
CPC .......... *H04W 72/54* (2023.01); *H04W 4/029* (2018.02); *H04W 4/06* (2013.01); *H04W 72/20* (2023.01)

(58) Field of Classification Search
CPC ... H04W 72/1226; H04W 4/029; H04W 4/06; H04W 72/0406
See application file for complete search history.

(56) References Cited

U.S. PATENT DOCUMENTS

2019/0230618 A1* 7/2019 Saur ..................... G01S 5/0236

FOREIGN PATENT DOCUMENTS

WO   2017186308 A1   11/2017
WO   WO-2020132284 A1 *  6/2020  ............ H04W 24/08

OTHER PUBLICATIONS

3GPP, "3rd Generation Partnership Project; Technical Specification Group Radio Access Network; NR; Study on Vehicle-to-Everything (Release 16)", 3GPP TR 38.885 V2.0.0, Mar. 2019, pp. 1-122.

(Continued)

*Primary Examiner* — Joshua L Schwartz
(74) *Attorney, Agent, or Firm* — Kunzler Bean & Adamson

(57) ABSTRACT

Apparatuses, methods, and systems are disclosed for selection of a scheduling user equipment. One embodiment of a computer-readable storage device storing machine readable code, when executed by a processor, cause the processor to receive first information from a plurality of user equipments, wherein the first information indicates at least one sidelink user equipment in communication with each user equipment of the plurality of user equipments. In some embodiments, the code further causes the processor to select a scheduling user equipment from the plurality of user equipments based on a quality of a first connection interface and a second connection interface of each user equipment of the plurality of user equipments indicated in the first information. In some embodiments, the code further causes the processor to transition to a fallback mode in response to mode 2d resource allocation being unavailable and occurrence of a radio link failure or a handover.

20 Claims, 4 Drawing Sheets

Related U.S. Application Data

(60) Provisional application No. 62/822,133, filed on Mar. 22, 2019.

(51) Int. Cl.
*H04W 4/06* (2009.01)
*H04W 72/04* (2023.01)
*H04W 72/54* (2023.01)
*H04W 72/20* (2023.01)

(56) References Cited

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V14.8.0, Sep. 2018, pp. 1-331.

Fujitsu, "Discussion on Basic Resource Allocation Methods for NR-V2X Sidelink Communication", 3GPP TSG RAN WG1 #96 R1-1901946, Feb. 25-Mar. 1, 2019, pp. 1-14.

Intel Corporation, "Feature Lead Summary for NR-V2X AI—7.2. 4.1 4 Resource Allocation Mechanism", 3GPP TSG RAN WG1 Meeting #96 R1-1903397, Feb. 28-Mar. 1, 2019, pp. 1-17.

NTT Docomo, Inc., "Sidelink resource allocation mechanism for NR V2X", 3GPP TSG RAN WG1 #96 R1-1902801, Feb. 25-Mar. 1, 2019, pp. 1-11.

NTT Docomo, Inc., "Sidelink resource allocation mechanism", 3GPP TSG RAN WG1 Meeting #95 R1-1813320, Nov. 12-16, 2018, pp. 1-9.

\* cited by examiner

SELECTION OF A SCHEDULING USER EQUIPMENT

CROSS-REFERENCE TO RELATED APPLICATIONS

This application is a Continuation Application of U.S. patent application Ser. No. 16/816,001 filed on Mar. 11, 2020, which claims priority to U.S. patent application Ser. No. 62/822,133 entitled "EFFICIENT RESOURCE SCHEDULING FOR V2X RESOURCE ALLOCATION MODE 2D OPERATION PROCEDURES" and filed on Mar. 22, 2019 for Karthikeyan Ganesan, which are incorporated herein by reference in their entirety.

FIELD

The subject matter disclosed herein relates generally to wireless communications and more particularly relates to selection of a scheduling user equipment.

BACKGROUND

The following abbreviations are herewith defined, at least some of which are referred to within the following description: Third Generation Partnership Project ("3GPP"), $5^{th}$ Generation ("5G"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC- UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCK"), Sidelink Control Information ("SCP"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TB S"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, a user equipment may be used for scheduling.

BRIEF SUMMARY

Methods for selection of a scheduling user equipment are disclosed. Apparatuses and systems also perform the functions of the methods. One embodiment of a computer-readable storage device storing machine readable code, when executed by a processor, cause the processor to receive first information from a plurality of user equipments, wherein the first information indicates at least one sidelink user equipment in communication with each user equipment of the plurality of user equipments. In some embodiments, the code further causes the processor to select a scheduling user equipment from the plurality of user equipments based on a quality of a first connection interface and a second connection interface of each user equipment of the plurality of user equipments indicated in the first information. In some embodiments, the code further causes the processor to transition to a fallback mode in response to mode 2d resource allocation being unavailable and occurrence of a radio link failure or a handover.

One apparatus for selection of a scheduling user equipment includes a receiver that receives first information from a plurality of user equipments, wherein the first information indicates at least one sidelink user equipment in communication with each user equipment of the plurality of user equipments. In certain embodiments, the apparatus includes a processor that selects a scheduling user equipment from the plurality of user equipments based on a quality of a first connection interface and a second connection interface of each user equipment of the plurality of user equipments indicated in the first information. The processor transitions to a fallback mode in response to mode 2d resource allocation being unavailable and occurrence of a radio link failure or a handover.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
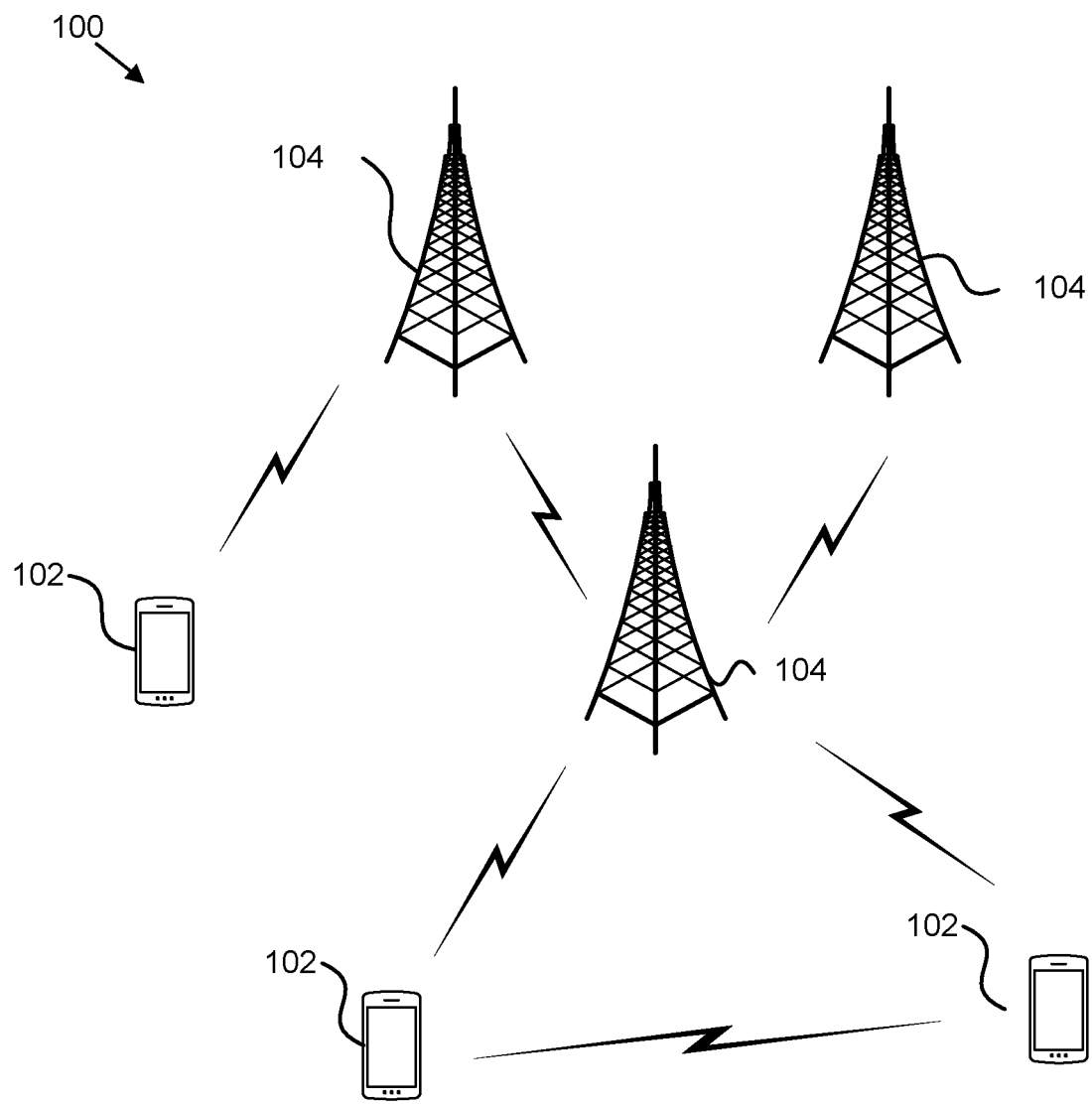
FIG. 1 is a schematic block diagram illustrating one embodiment of a wireless communication system for selection of a scheduling user equipment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for selection of a scheduling user equipment. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive first information from a plurality of user equipments (e.g., remote units 102), wherein the first information indicates at least one sidelink user equipment in communication with each user equipment of the plurality of user equipments. In some embodiments, the network unit 104 may select a scheduling user equipment from the plurality of user equipments based on a quality of a first connection interface and a second connection interface of each user equipment of the plurality of user equipments indicated in the first information. Accordingly, the network unit 104 may be used for selection of a scheduling user equipment.

Figure 2:
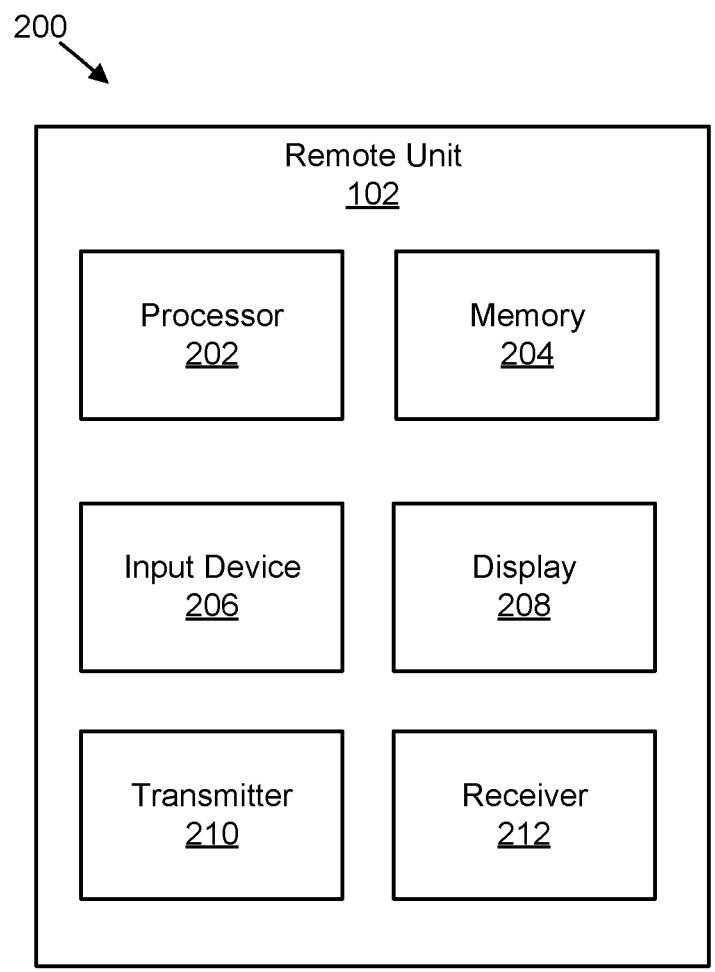
FIG. 2 is a schematic block diagram illustrating one embodiment of an apparatus that may be used as a scheduling user equipment.

FIG. 2 depicts one embodiment of an apparatus 200 that may be used as a scheduling user equipment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the transmitter 210 may transmit messages to other remote units 102. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
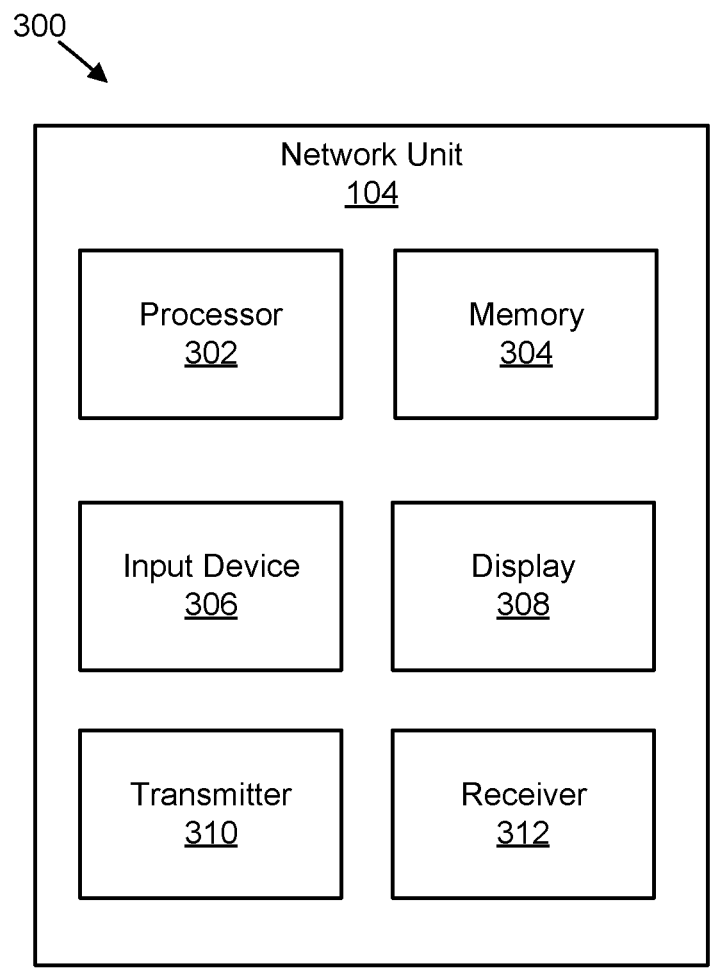
FIG. 3 is a schematic block diagram illustrating one embodiment of an apparatus that may be used for selection of a scheduling user equipment.

FIG. 3 depicts one embodiment of an apparatus 300 that may be used for selection of a scheduling user equipment. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 may receive first information from a plurality of user equipments, wherein the first information indicates at least one sidelink user equipment in communication with each user equipment of the plurality of user equipments. In certain embodiments, the processor 302 may select a scheduling user equipment from the plurality of user equipments based on a quality of a first connection interface and a second connection interface of each user equipment of the plurality of user equipments indicated in the first information.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, V2X resource allocation may be based on mode 2d operational procedures in a physical layer (e.g., such as an interest indication to become SUE, selection of SUE, creating neighbor list based on L1 measurement or SL positioning, resource allocation, and fall back operational modes). In such embodiments, an application layer may not be aware of a radio link quality of a UE and may not select the right scheduling UE for a group. Moreover, in such embodiments, a BS may be involved to choose the SUE in a selection procedure.

In certain embodiments, there may be two SL resource allocation modes: mode 1 in which a BS schedules SL resources to be used by a UE for SL transmissions; and mode 2 in which the UE determines (e.g., BS does not schedule) SL transmission resources within SL resources configured by the BS, the network, or pre-configured SL resources.

In various embodiments, the definition of SL resource allocation mode 2 may cover: a) a UE autonomously selects SL resource for transmission; b) the UE assists SL resource selection for other UEs; c) the UE is configured with NR configured grant (e.g., type-1 like) for SL transmission; and/or d) the UE schedules SL transmissions of other UEs.

In some embodiments, in the context of mode-2(d), NR V2X may support the following functionality: a) a UE informs a gNB about group members and the gNB provides individual resource pool configuration and/or individual resource configuration through the same UE to each group member UE within the same group—it may not require connection between the member UE and the gNB; b) the UE cannot modify the configuration provided by the gNB; c) higher layer signaling may be used to provide configuration—no physical layer signaling is used; d) one or both resource pool configurations and resource configuration may be supported; and/or e) functionality defined as a part of mode-2 may applicable for this feature. As may be appreciated, functionalities described herein may be up to UE capabilities.

In certain embodiments, such as for group-based SL communication, a UE-A may inform its serving gNB about members UE-B, UE-C, and so on of a group, and the gNB may provide individual resource pool configurations and/or individual resource configurations to each group member through UE-A. In such embodiments, the UE-A cannot modify the configurations, and there is no direct connection required between any member UE and the gNB. Higher-layer only signaling may be used to provide the configurations, and such functionality may be up to UE capabilities.

As used herein, the term eNB and/or gNB may be used for a base station, but it may be replaceable by any other radio access node (e.g., BS, eNB, gNB, AP, NR, and so forth). Furthermore, various methods may be described in the context of 5G NR; however, the methods may be equally applicable to other mobile communication systems supporting serving cells and/or carriers configured for sidelink communication over a PC5 interface.

In various embodiments, a V2X transmitting UE may periodically receive and/or decode SCI from other neighboring UEs and the SCI content may include information about a source ID, a destination ID, and/or a group ID. In some embodiments, V2X group formation may happen in two ways: 1) the group is semi statically formed based on a layer 2 ID or in an application layer for a particular session based application (e.g., platooning, etc.); and 2) the group is dynamically configured based on a certain communication range.

In certain embodiments, every V2X UE may be aware of neighbor UEs that may be its group members. In such embodiments, the V2X UE may create and/or maintain one or more neighbor lists for each layer 2 group ID or application ID based on a SL L1 RSRP and/or RSSI measured from a PSCCH DMRS.

In various embodiments, as part of an SUE selection process criteria, UEs may nominate themselves for the role of SUE by transmitting an interest indication to a gNB. In such embodiments, if there are many interested UEs, as part of the selection process, the gNB may select an SUE based on the quality of the UE's Uu and/or PC5 connection (e.g., determined by measuring a SL RSRP of group members) in which the quality is above a corresponding threshold.

In some embodiments, as part of interest indication signaling to a gNB about a UE's intention to become an SUE, the UE may transmit additional information such as a group ID, a number of group members identified that may be included in a neighbor list, a number of active transmitters that may be part of the group members, a minimum QoS and/or a maximum QoS range for the group members, a degree of automation of the group members (e.g., may be low degree of automation to a higher and/or highest degree of automation that may indirectly relate to a latency and/or a reliability requirement of the group members), a transmit rate of a message, a message size, a cast type, and so forth. In such embodiments, the interest indication signaling from the UE to the gNB may be made using RRC signaling, using MAC CE signaling, using L1 signaling, with the combination of additional information, as part of a UE assistance report, and/or as part of a measurement report. Moreover, in such embodiments, either the gNB provides a SL L1 RSRP and/or RSSI threshold for group member identification to the UE or the gNB filters the group members shared by the interested UE based on the RSRP and/or RSSI threshold and/or required communication range provided by a higher layer.

In one embodiment, a UE may share a neighbor cell list and/or a number of neighboring group members with or without a PC5 link quality with a BS as and when required (e.g., for an SUE seeking resources to schedule group members, a member UE indicating interest in becoming the SUE etc.). In certain embodiments, a BS may explicitly ask about a UEs belonging to a certain group, a certain geographical area, and/or a communication range to transmit interest indication. In some embodiments, UEs (e.g., based on a UE capability) may include one or more features (e.g., relay ability, a higher number of antennas for Uu and/or SL, a high transmit power, a capability to form multiple beams, and/or a car capability such a height of the car, a high battery capacity, and so forth) with a transmission of an interest indication to a BS. In various embodiments, an SUE may report member UEs within a minimum communication range indicated by upper layers and/or may report active member UEs within the minimum communication range. As used herein, active member UEs may mean group member with potential V2X message transmission requirements.

In certain embodiments, a sidelink positioning method may be used to determine group members within a certain communication range. With the SL positioning method, a TX UE may determine a location of RX UEs in a group or information from which the location of RX UEs may be inferred. The information used to infer the location of RX UEs may be global location coordinates of RX UEs or some relative positioning information that may be based on a time of arrival, flight measurements, spatial measurements, and/or angular measurements (e.g., AoA, AoD) from a latest received transmission from the TX UE.

In some embodiments, RX UEs may be configured to report either time of arrival, AoA, and/or AoD measurements from a configured set of RSs, and the RSs may be either S-SSB, S-CSI RS, or S-PRS transmissions from a TX UE. A TX UE may perform beam sweeping transmission of RSs from multiple antenna panels and may indicate to report a relative positioning measurement report in SCI. In one embodiment, an RX UE reports a beam ID and a relative positioning report to a TX UE. A number of beams used for transmission of RSs may be different for different antenna panels (e.g., depending on a size of the antenna panels—number of antenna elements, directivity and/or launch angles capability of the antenna panels, and/or placement of the antenna panels on the vehicle). In various embodiments, a resource set that includes a RS resource identifier and a sequence ID configured for beam sweeping transmission may be indicated in SCI by a TX UE using a groupcast or broadcast transmission. In certain embodiments, RX UEs report a beam index of a strongest received RS and a Tx UE maps the index of the strongest received RS beam to a beam direction. The beam direction may be used to calculate an AoD. In some embodiments, an RX UE may report a ToF and/or an AoA to a TX UE. A feedback resource and/or a feedback timing for a RX UE may be semi-statically or dynamically configured either by a TX UE or by a BS.

In various embodiments, a gNB determines (e.g., selects) an SUE based on a radio link quality in Uu and/or PC5 as part of a selection process. In such embodiments, a number of member UE that may be identified by an SUE may be more compared to other UE's in the group. In certain embodiments, after a gNB receives an interest indication signaling an interest of a UE to become an SUE, the gNB checks whether mode 2d operation is enabled to operate in its cellular area, in its geographical area, and/or based on availability of resources. If mode 2d operation is not enabled, then the gNB may transmit a reject message to the UE and, if there are not enough resources available, the gNB may inform the UE to transmit the request after a certain period of time. If the mode 2d operation is enable, then the gNB transmits information indicating selection of the SUE to its group member either via unicast or multicast signaling with additional information (e.g., UE ID of the SUE, common resources allocated for the group members and/or resource allocated to each member of the group, a cast type allowed, a flag to indicate whether member UEs are enabled to perform a sensing operation to select resources, long term and/or short term sensing needed by the group members to select the resource from the common resource, validity of the resources, communication range of the SUE, fallback operational mode due to mobility event, fallback SL carrier frequency, and/or resource pools). In some embodiments, signaling to member UEs may be done directly by a gNB (e.g., to in-coverage UEs and/or RRC connected UEs) and/or via the selected SUE (e.g., to out of coverage UEs, RRC idle UEs, or UEs in neighboring cells—since the SUE may not be aware of the Uu state of the members, it makes a groupcast transmission). In certain embodiments, a gNB notifies an SUE using one or more of RRC signaling, MAC CE signaling, and/or SCI signaling. In various embodiments, a gNB may indicate using a flag either in RRC, MIB, and/or SIB's whether or not mode 2d operation is enabled. In some embodiments, an SUE may use a groupcast transmission in PC5 RRC, PSBCH, PSCCH, and/or PSSCH to relay a message to group members. In certain embodiments, an SUE may use a beam sweeping transmission and/or groupcast HARQ ACK/NACK feedback to facilitate reception by group members. In various embodiments, a dedicated resource provided by a gNB to each group member may be relayed by an SUE with a PC5 unicast transmission either with PC5 RRC, PSSCH, PSCCH, and/or MAC CE. In some embodiments, a fallback operational mode and resource pools may be indicate by a gNB in one SIB message.

In certain embodiments, a resource selection method of a group member on a common resource could may depend on a validity of the resource provided by a gNB or an SUE. If a validity of a resource is less than a long term sensing window size, then a UE autonomously uses a short term sensing and/or random selection on common resources. In such embodiments, either the gNB or the SUE may provide information about short term sensing parameters (e.g., threshold, sensing window, PSSCH time and/or frequency location in a common resource pool). In various embodiments, a gNB or an SUE may provide a time and frequency location of PSCCH in a resource pool and a DMRS configuration (e.g., with an assumption that the PSCCH and PSSCH are located in the same resource pool). In such embodiments, the member UE may use this information about a PSCCH-DMRS to perform short term energy sensing within a configured sensing window and to determine whether or not a resource is available for transmission. In some embodiments, if a gNB or an SUE provides multiple patterns and/or configured grant type 1 (e.g., a pattern is defined by a size and positions of a resource in time and frequency, and a number of resources) for group members to select via groupcast or unicast signaling (e.g., via SCI, MAC CE, and/or PC5 RRC), then the group members perform short term energy sensing on a PSSCH-DMRS to select an unused pattern. As may be appreciated, each pattern may use the same configured DMRS location; otherwise, if a location of the DMRS in each pattern is different, it may be signaled to the group member UEs. In certain embodiments, the SUE may configure a sidelink mode of operation of group members via groupcast or unicast signaling that may be based on SCI, MAC CE, and/or PC5 RRC. In various embodiments, a sidelink sub mode may include sidelink dynamic scheduling by a SUE. The operation procedure of this submode may be similar to mode 1 resource allocation. The concept of SR/BSR to request resources and transmit the buffer status report may be used for this submode. A new sidelink physical channel may be used to carry SR, BSR, PHR, and/or a power control command may be defined for information exchange between the SUE and group member. The power control command may be indicated in SFCI, PSFCH, PSCCH, and/or PSSCH. In some embodiments, an SUE may transmit a configuration of configured grant type 1 and/or configured grant type 2 like resources to each group member UE via groupcast or unicast signaling and activation and/or deactivation messages via SCI, MAC CE, and/or an SCI format. The SCI format may be defined for any SUE procedure described herein.

In certain embodiments, a gNB (e.g., besides choosing an SUE) may choose a candidate SUE or a candidate SUE list based on an interest indication message received from one or more UEs. The gNB may inform group members of the candidate SUE list. The candidate SUE list may be periodically evaluated and refreshed based on a radio link quality of a Uu and/or a PC5 (e.g., the PC5 radio link quality may be based on a neighbor measurement that may be either RSRP or positioning based). If the link quality of a candidate SUE is better than a serving SUE, then the gNB may reselect an SUE. In various embodiments, monitoring a link quality may include a Uu quality of the RRC connected candidate SUEs and/or a PC5 link quality of candidate UEs with their identified group members.

In some embodiments, there may be a fall back operational mode due to a mobility event such as RLF and/or handover. If a mode 2d based resource allocation is not available, then the fallback operational mode is used. The fallback operational mode enables fallback to any other scheduling methods including mode-1, mode-2 (e.g., any mode 2 sub modes), and/or preconfigured resource pools with or without a sensing operation.

In various embodiments, for a radio link failure of an SUE with respect to a gNB, either the gNB may reselect an SUE from a candidate list as a next serving SUE, or, because the SUE is aware of the candidate SUE list, the SUE may groupcast to the candidate SUEs about the SUEs impending radio link failure. Each candidate SUE may evaluate link quality with respect to the gNB and then groupcast to the group members with its UE ID is to become the serving SUE. In one embodiment, if there is more than one candidate SUE, then a candidate SUE is selected that has a maximum number of identified group member UEs.

In certain embodiments, if one group member UE or SUE initiates a handover, then a serving gNB may signal permission in a handover command as part of UE context information for mode 2d operation in a target gNB with additional information such as a number of active transmitters, a QoS, resource requirements, and so forth. If the target gNB accepts a handover request and provides new resources from its cell, then the serving gNB may inform the SUE and/or group member UEs of the configuration of the target gNB. If mode 2d operation is not possible in the target gNB and/or the target gNB does not have enough resources, then the source gNB may switch the group to a fallback operational mode, such as mode 1, mode 2a, or mode 2c. In some embodiments, an SUE may inform group members about a change in an operation mode via sidelink signaling that may be SCI, MAC CE, and/or PC5 RRC. If SCI is used, a bit field may be used to indicate a mode and/or a specific SCI format may be used to distinguish each mode.

In some embodiments, an SUE selection may be based on a PC5 link quality with its neighboring UEs. The neighboring UEs may be sync ref UEs, or any other UEs in a group, in a certain geographical area, and/or based on identified group members from its neighbor. In one embodiment, a UE acting as a sync ref UE (e.g., providing sidelink timing information to a group of UEs) or any other UEs may explicitly transmit a request message via group cast PSCCH to transmit a SL RSRP and/or RSSI measurement based on a configured RS which could be S-SSB, S-CSI RS, S-DMRS-PSCCH, and/or SL positioning. In certain embodiments, a UE may transmit an interest indication to other neighboring UEs via sidelink groupcast or broadcast transmission with various parameters via PC5 RRC, MAC CE, PDCP control, SCI, and so forth.

In various embodiments, resource selection by an SUE may be carried by a sensing operation that may include receiving and/or decoding SCI on indicated resource pools. In some embodiments, in an SCI transmission to other UEs, an SUE may indicate a group ID (e.g., layer 1 group ID, layer 2 group ID, etc.) in a source ID field and/or required resources (e.g., in terms of resource pools, validity period of the resources, and so forth). The SUE may also indicate a priority value in a QoS priority that indicates to other UEs that the resources are reserved for mode 2d operations. In certain embodiments, an SCI format may be used to indicate mode 2d operations to other UEs. In some embodiments, only an SUE in a group may sense and reserve resources on behalf of group members.

In some embodiments, SUE selection is based on a quality of a Uu and/or a PC5 connection (e.g., obtained by measuring a SL RSRP of group members) being above a corresponding threshold.

In certain embodiments, an SUE may create a neighbor list for each destination group (e.g., corresponding to a L2 ID or an application layer group ID) based on SL RSRP and/or SL positioning.

In various embodiments, a UE may share a neighbor cell list and/or a number of neighboring group members with or without a PC5 link quality with a BS as and when required (e.g., for an SUE seeking resources to schedule group members, for a member UE indicating interest in becoming the SUE, and so forth).

In some embodiments, a gNB selects an SUE and notifies group members using a L2 ID of the selected SUE. In such embodiments, additional parameters may also be signaled, such as allowed cast types, duration of resource pool validity, and so forth. Signaling member UEs may be done directly by a gNB (e.g., to in-coverage and/or RRC connected UEs) and/or via a selected SUE (e.g., to out of coverage UEs, RRC idle UEs, and/or UEs in neighboring cells). Because the SUE may not be aware of a Uu state of member UEs, the SUE may make a groupcast transmission.

In certain embodiments, a gNB may keep a candidate SUE list and may continuously monitor a link quality of the candidate SUE. This may lead to reselection of an SUE.

In various embodiments, monitoring link quality may include a Uu quality of RRC connected candidate SUEs and/or a PC5 link quality of the candidate SUEs with their identified group members.

In some embodiments, there may be a fall back operational mode due to a mobility event such as RLF and/or handover. In such embodiments, if a mode 2d based resource allocation is not available, then a fallback operational mode may be used thereby enabling fallback to any other scheduling method including mode-1, mode-2, and/or preconfigured resource pools with or without a sensing operation.

In certain embodiments, an SUE reports member UEs that are within a minimum communication range indicated by upper layers and/or reports active member UEs that are within the minimum communication range. As may be appreciated, active member UEs may mean group member with potential V2X message transmission requirements.

Figure 4:
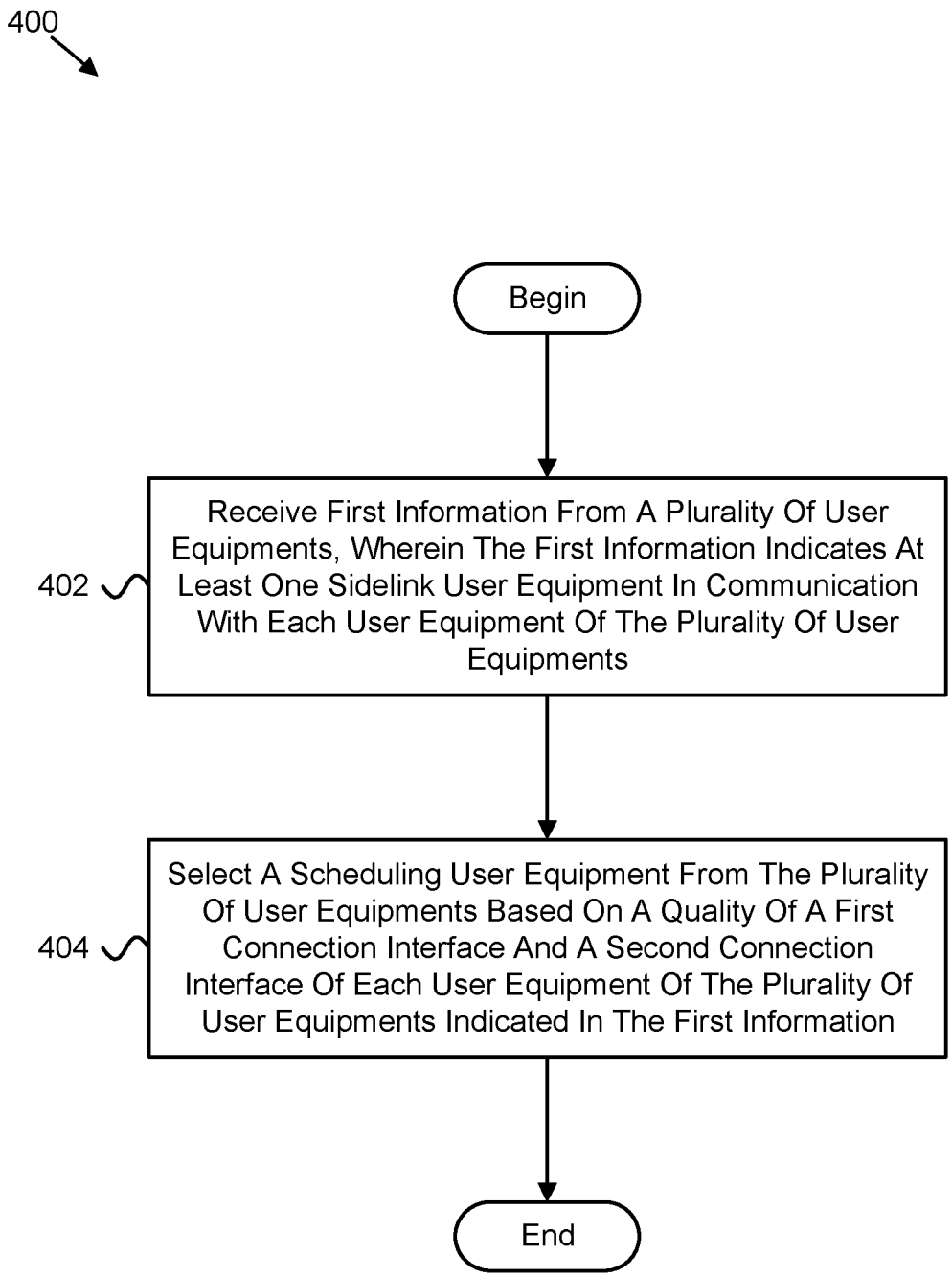
FIG. 4 is a flow chart diagram illustrating one embodiment of a method for selection of a scheduling user equipment.

FIG. 4 is a flow chart diagram illustrating one embodiment of a method 400 for selection of a scheduling user equipment. In some embodiments, the method 400 is performed by an apparatus, such as the network unit 104. In certain embodiments, the method 400 may be performed by a processor executing program code, for example, a microcontroller, a microprocessor, a CPU, a GPU, an auxiliary processing unit, a FPGA, or the like.

The method 400 may include receiving 402 first information from a plurality of user equipments, wherein the first information indicates at least one sidelink user equipment in communication with each user equipment of the plurality of user equipments. In some embodiments, the method 400 includes selecting 404 a scheduling user equipment from the plurality of user equipments based on a quality of a first connection interface and a second connection interface of each user equipment of the plurality of user equipments indicated in the first information.

In certain embodiments, the first connection interface comprises an interface between a user equipment and a network device. In some embodiments, the second connection interface comprises an interface between a first user equipment and a second user equipment. In various embodiments, the scheduling user equipment is selected from the plurality of user equipments in response to a first quality of the first connection interface being greater than a first threshold and a second quality of the second connection interface being greater than a second threshold.

In one embodiment, the quality of the first connection interface and the second connection interface is determined by measuring a sidelink reference signal received power. In certain embodiments, the first information is determined based on sidelink reference signal received power, sidelink positioning, or a combination thereof.

In some embodiments, the sidelink positioning is determined based on a global positioning location or a relative position. In various embodiments, the relative position is based on a time of arrival, a time of flight, a spatial measurement, an angular measurement, an angle of arrival, an angle of arrival, or some combination thereof. In one embodiment, the method 400 further comprises transmitting second information indicating the scheduling user equipment.

In certain embodiments, the second information is transmitted via unicast or multicast signaling. In some embodiments, the second information comprises a user equipment identifier corresponding to the scheduling user equipment, an allocation of a common resource, an allocation of a user equipment specific resource, an allowed cast type, a sensing operation indication, sensing information corresponding to the common resource, a validity of the common resource, a scheduling user equipment communication range, a fallback operation mode, a fallback sidelink carrier frequency, a fallback sidelink resource pool, or some combination thereof. In various embodiments, the second information comprises short term sensing parameters, a time and frequency location of a sidelink control channel in a resource pool, a demodulation reference signal configuration, or some combination thereof.

In one embodiment, the short term sensing parameters comprise a threshold, a sensing window, a time and frequency location of a sidelink control channel in a resource pool, or some combination thereof. In certain embodiments, the method 400 further comprises receiving updated first information from the plurality of user equipments. In some embodiments, the method 400 further comprises reselecting the scheduling user equipment from the plurality of user equipments based on the updated first information.

In various embodiments, the method 400 further comprises transitioning to a fall back mode in response to mode 2d resource allocation being unavailable and occurrence of a radio link failure or a handover. In one embodiment, the fall back mode comprises a mode 1, a mode 2, a configured resource pool, a preconfigured resource pool, or some combination thereof. In certain embodiments, the scheduling user equipment indicates a group identifier, resource pool resources, a priority value, or some combination thereof to one or more sidelink user equipments.

In one embodiment, a method comprises:

receiving first information from a plurality of user equipments, wherein the first information indicates at least one sidelink user equipment in communication with each user equipment of the plurality of user equipments; and selecting a scheduling user equipment from the plurality of user equipments based on a quality of a first connection interface and a second connection interface of each user equipment of the plurality of user equipments indicated in the first information.

In certain embodiments, the first connection interface comprises an interface between a user equipment and a network device.

In some embodiments, the second connection interface comprises an interface between a first user equipment and a second user equipment.

In various embodiments, the scheduling user equipment is selected from the plurality of user equipments in response to a first quality of the first connection interface being greater than a first threshold and a second quality of the second connection interface being greater than a second threshold.

In one embodiment, the quality of the first connection interface and the second connection interface is determined by measuring a sidelink reference signal received power.

In certain embodiments, the first information is determined based on sidelink reference signal received power, sidelink positioning, or a combination thereof.

In some embodiments, the sidelink positioning is determined based on a global positioning location or a relative position.

In various embodiments, the relative position is based on a time of arrival, a time of flight, a spatial measurement, an angular measurement, an angle of arrival, an angle of arrival, or some combination thereof.

In one embodiment, the method further comprises transmitting second information indicating the scheduling user equipment.

In certain embodiments, the second information is transmitted via unicast or multicast signaling.

In some embodiments, the second information comprises a user equipment identifier corresponding to the scheduling user equipment, an allocation of a common resource, an allocation of a user equipment specific resource, an allowed cast type, a sensing operation indication, sensing information corresponding to the common resource, a validity of the common resource, a scheduling user equipment communication range, a fallback operation mode, a fallback sidelink carrier frequency, a fallback sidelink resource pool, or some combination thereof.

In various embodiments, the second information comprises short term sensing parameters, a time and frequency location of a sidelink control channel in a resource pool, a demodulation reference signal configuration, or some combination thereof.

In one embodiment, the short term sensing parameters comprise a threshold, a sensing window, a time and frequency location of a sidelink control channel in a resource pool, or some combination thereof.

In certain embodiments, the method further comprises receiving updated first information from the plurality of user equipments.

In some embodiments, the method further comprises reselecting the scheduling user equipment from the plurality of user equipments based on the updated first information.

In various embodiments, the method further comprises transitioning to a fall back mode in response to mode 2d resource allocation being unavailable and occurrence of a radio link failure or a handover.

In one embodiment, the fall back mode comprises a mode 1, a mode 2, a configured resource pool, a preconfigured resource pool, or some combination thereof.

In certain embodiments, the scheduling user equipment indicates a group identifier, resource pool resources, a priority value, or some combination thereof to one or more sidelink user equipments.

In one embodiment, an apparatus comprises: a receiver that receives first information from a plurality of user equipments, wherein the first information indicates at least one sidelink user equipment in communication with each user equipment of the plurality of user equipments; and a processor that selects a scheduling user equipment from the plurality of user equipments based on a quality of a first connection interface and a second connection interface of each user equipment of the plurality of user equipments indicated in the first information.

In certain embodiments, the first connection interface comprises an interface between a user equipment and a network device.

In some embodiments, the second connection interface comprises an interface between a first user equipment and a second user equipment.

In various embodiments, the scheduling user equipment is selected from the plurality of user equipments in response to a first quality of the first connection interface being greater than a first threshold and a second quality of the second connection interface being greater than a second threshold.

In one embodiment, the quality of the first connection interface and the second connection interface is determined by measuring a sidelink reference signal received power.

In certain embodiments, the first information is determined based on sidelink reference signal received power, sidelink positioning, or a combination thereof.

In some embodiments, the sidelink positioning is determined based on a global positioning location or a relative position.

In various embodiments, the relative position is based on a time of arrival, a time of flight, a spatial measurement, an angular measurement, an angle of arrival, an angle of arrival, or some combination thereof.

In one embodiment, the apparatus further comprises a transmitter that transmits second information indicating the scheduling user equipment.

In certain embodiments, the second information is transmitted via unicast or multicast signaling.

In some embodiments, the second information comprises a user equipment identifier corresponding to the scheduling user equipment, an allocation of a common resource, an allocation of a user equipment specific resource, an allowed cast type, a sensing operation indication, sensing information corresponding to the common resource, a validity of the common resource, a scheduling user equipment communication range, a fallback operation mode, a fallback sidelink carrier frequency, a fallback sidelink resource pool, or some combination thereof.

In various embodiments, the second information comprises short term sensing parameters, a time and frequency location of a sidelink control channel in a resource pool, a demodulation reference signal configuration, or some combination thereof.

In one embodiment, the short term sensing parameters comprise a threshold, a sensing window, a time and frequency location of a sidelink control channel in a resource pool, or some combination thereof.

In certain embodiments, the receiver receives updated first information from the plurality of user equipments.

In some embodiments, the processor reselects the scheduling user equipment from the plurality of user equipments based on the updated first information.

In various embodiments, the processor transitions to a fall back mode in response to mode 2d resource allocation being unavailable and occurrence of a radio link failure or a handover.

In one embodiment, the fall back mode comprises a mode 1, a mode 2, a configured resource pool, a preconfigured resource pool, or some combination thereof.

In certain embodiments, the scheduling user equipment indicates a group identifier, resource pool resources, a priority value, or some combination thereof to one or more sidelink user equipments.

In one embodiment, a computer readable storage device storing machine readable code, when executed by a processor, cause the processor to receive first information from a plurality of user equipments, wherein the first information indicates at least one sidelink user equipment in communication with each user equipment of the plurality of user equipments, select a scheduling user equipment from the plurality of user equipments based on a quality of a first connection interface and a second connection interface of each user equipment of the plurality of user equipments indicated in the first information, and transition to a fallback mode in response to mode 2d resource allocation being unavailable and occurrence of a radio link failure or a handover.

In certain embodiments, the code further causes to select the scheduling user equipment selected from the plurality of user equipments in response to a first quality of the first connection interface being greater than a first threshold and a second quality of the second connection interface being greater than a second threshold.

In certain embodiments, the code further causes to determine the quality of the first connection interface and the second connection interface by measuring a sidelink reference signal received power.

In certain embodiments, the code further causes to determine the first information based on sidelink reference signal received power, sidelink positioning, or a combination thereof.

In certain embodiments, the code further causes to determine the sidelink positioning based on a global positioning location or a relative position.

In certain embodiments, the relative position is based on a time of arrival, a time of flight, a spatial measurement, an angular measurement, an angle of arrival, or some combination thereof.

In certain embodiments, the code further causes to transmit second information indicating the scheduling user equipment.

In certain embodiments, the second information comprises a user equipment identifier corresponding to the scheduling user equipment, an allocation of a common resource, an allocation of a user equipment specific resource, an allowed cast type, a sensing operation indication, sensing information corresponding to the common resource, a validity of the common resource, a scheduling user equipment communication range, a fallback operation mode, a fallback sidelink carrier frequency, a fallback sidelink resource pool, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprises:
a receiver that receives first information from a plurality of user equipments, wherein the first information indicates at least one sidelink user equipment in communication with each user equipment of the plurality of user equipments; and
a processor that
selects a scheduling user equipment from the plurality of user equipments based on a quality of a first connection interface and a second connection interface of each user equipment of the plurality of user equipments indicated in the first information; and
transitions to a fallback mode in response to mode 2d resource allocation being unavailable and occurrence of a radio link failure or a handover,
wherein the first connection interface comprises an interface between a user equipment and a network device,
wherein the second connection interface comprises an interface between a first user equipment and a second user equipment.

2. The apparatus of claim 1, wherein the scheduling user equipment is selected from the plurality of user equipments in response to a first quality of the first connection interface being greater than a first threshold and a second quality of the second connection interface being greater than a second threshold.

3. The apparatus of claim 1, wherein the quality of the first connection interface and the second connection interface is determined by measuring a sidelink reference signal received power.

4. The apparatus of claim 1, wherein the first information is determined based on sidelink reference signal received power, sidelink positioning, or a combination thereof.

5. The apparatus of claim 4, the sidelink positioning is determined based on a global positioning location or a relative position.

6. The apparatus of claim 5, wherein the relative position is based on a time of arrival, a time of flight, a spatial measurement, an angular measurement, an angle of arrival, an angle of arrival, or some combination thereof.

7. The apparatus of claim 1, wherein the apparatus further comprises a transmitter that transmits second information indicating the scheduling user equipment.

8. The apparatus of claim 7, wherein the second information is transmitted via unicast or multicast signaling.

9. The apparatus of claim 7, wherein the second information comprises a user equipment identifier corresponding to the scheduling user equipment, an allocation of a common resource, an allocation of a user equipment specific resource, an allowed cast type, a sensing operation indication, sensing information corresponding to the common resource, a validity of the common resource, a scheduling user equipment communication range, a fallback operation mode, a fallback sidelink carrier frequency, a fallback sidelink resource pool, or some combination thereof.

10. The apparatus of claim 7, wherein the second information comprises short term sensing parameters, a time and frequency location of a sidelink control channel in a resource pool, a demodulation reference signal configuration, or some combination thereof.

11. The apparatus of claim 10, wherein the short term sensing parameters comprise a threshold, a sensing window, a time and frequency location of a sidelink control channel in a resource pool, or some combination thereof.

12. The apparatus of claim 1, wherein the receiver receives updated first information from the plurality of user equipments.

13. The apparatus of claim 12, wherein the processor reselects the scheduling user equipment from the plurality of user equipments based on the updated first information.

14. The apparatus of claim 1, wherein the fallback mode comprises a mode 1, a mode 2, a configured resource pool, a preconfigured resource pool, or some combination thereof.

15. The apparatus of claim 1, wherein the scheduling user equipment indicates a group identifier, resource pool resources, a priority value, or some combination thereof to one or more sidelink user equipments.

16. A method comprising:
receiving first information from a plurality of user equipments, wherein the first information indicates at least one sidelink user equipment in communication with each user equipment of the plurality of user equipments;
selecting a scheduling user equipment from the plurality of user equipments based on a quality of a first connection interface and a second connection interface of each user equipment of the plurality of user equipments indicated in the first information; and
transitioning to a fall back mode in response to mode 2d resource allocation being unavailable and occurrence of a radio link failure or a handover,
wherein the first connection interface comprises an interface between a user equipment and a network device,
wherein the second connection interface comprises an interface between a first user equipment and a second user equipment.

17. The method of claim 16, wherein the scheduling user equipment is selected from the plurality of user equipments in response to a first quality of the first connection interface being greater than a first threshold and a second quality of the second connection interface being greater than a second threshold.

18. The method of claim 16, wherein the quality of the first connection interface and the second connection interface is determined by measuring a sidelink reference signal received power.

19. The method of claim 16, wherein the first information is determined based on sidelink reference signal received power, sidelink positioning, or a combination thereof, wherein the sidelink positioning is determined based on a global positioning location or a relative position,
wherein the relative position is based on a time of arrival, a time of flight, a spatial measurement, an angular measurement, an angle of arrival, or some combination thereof.

20. The method of claim 16, further comprising transmitting second information indicating the scheduling user equipment.

* * * * *